INVENTORS
STUART O. FIEDLER
WILLIAM S. FIEDLER
JOHN W. FROST

ATTORNEY

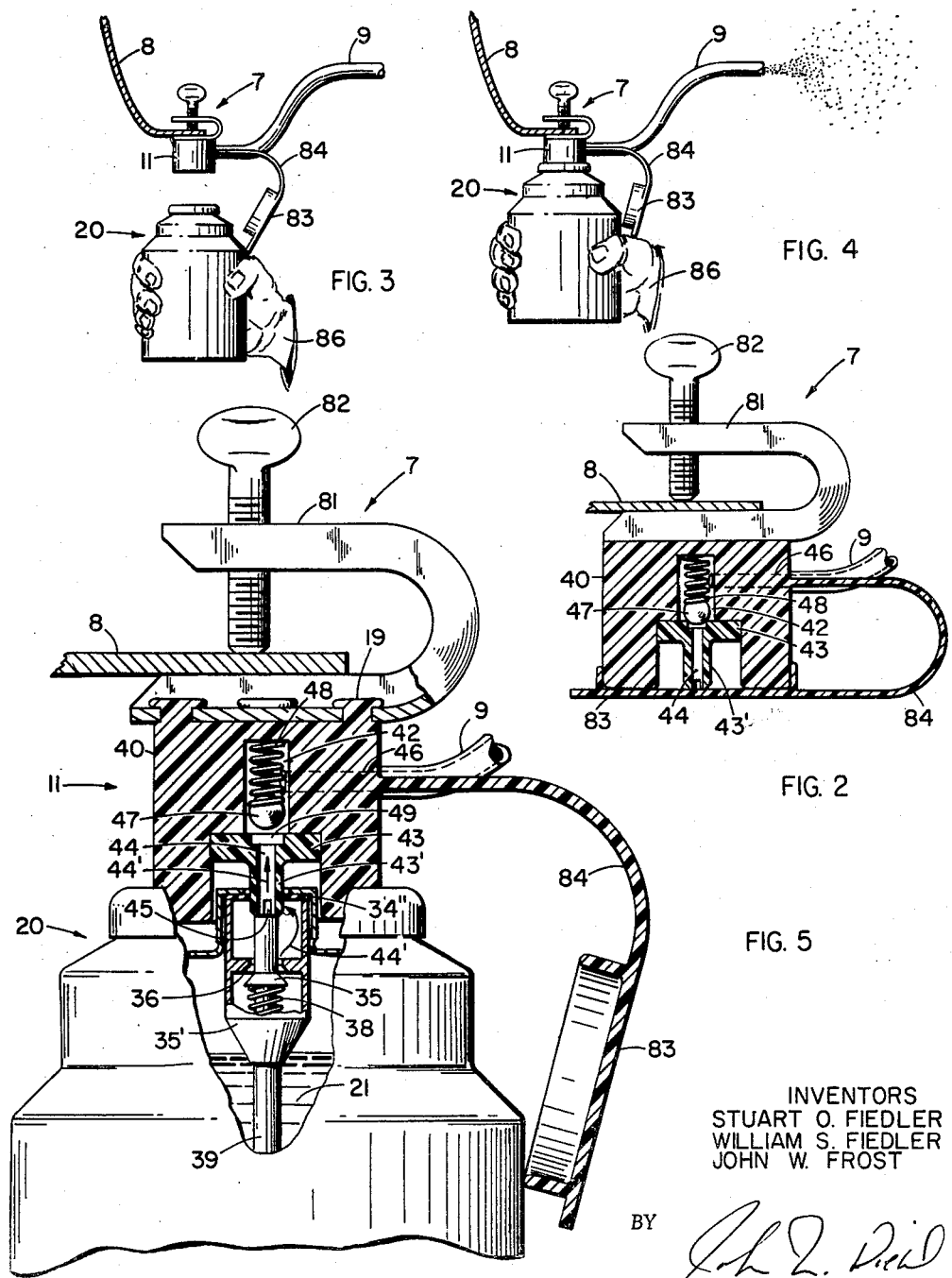

Sept. 15, 1964    W. S. FIEDLER ETAL    3,148,670
INTRODUCING COMBUSTIBLE FLUID TO INTERNAL
COMBUSTION ENGINE FUEL LINE
Original Filed Aug. 7, 1961    8 Sheets-Sheet 3
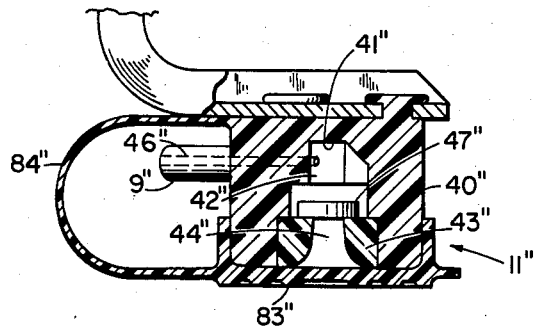
FIG. 6
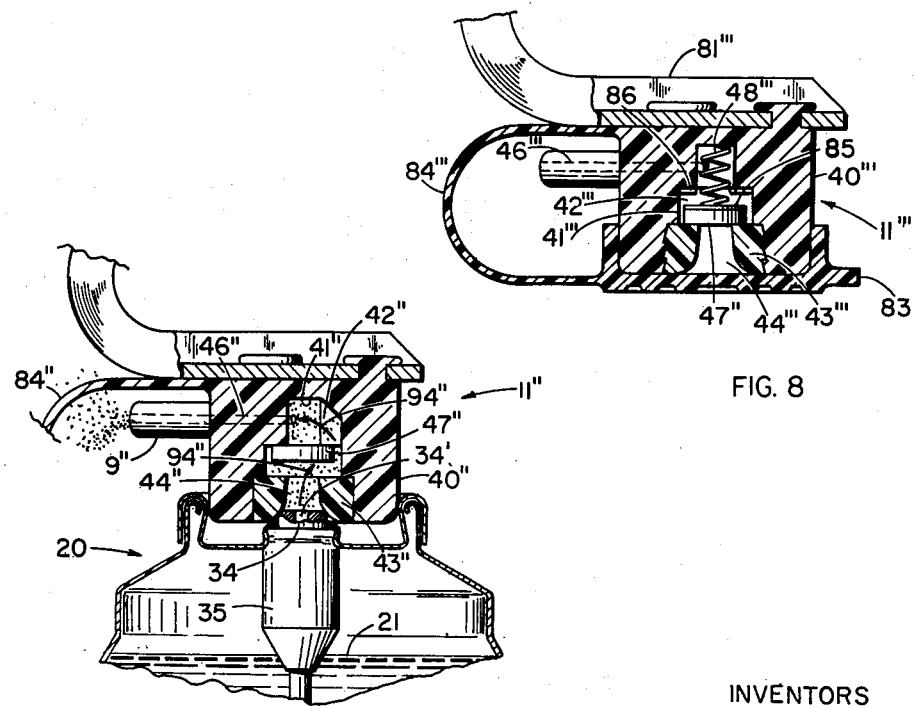
FIG. 8
FIG. 7
INVENTORS
STUART O. FIEDLER
WILLIAM S. FIEDLER
JOHN W. FROST.
BY
ATTORNEY Sept. 15, 1964 W. S. FIEDLER ETAL 3,148,670
INTRODUCING COMBUSTIBLE FLUID TO INTERNAL
COMBUSTION ENGINE FUEL LINE
Original Filed Aug. 7, 1961 8 Sheets-Sheet 4

INVENTORS
STUART O. FIEDLER
WILLIAM S. FIEDLER
JOHN W. FROST

BY

ATTORNEY

INVENTORS
STUART O. FIEDLER
WILLIAM S. FIEDLER
JOHN W. FROST

BY *John L. Diel*

ATTORNEY

Sept. 15, 1964   W. S. FIEDLER ETAL   3,148,670
INTRODUCING COMBUSTIBLE FLUID TO INTERNAL
COMBUSTION ENGINE FUEL LINE
Original Filed Aug. 7, 1961   8 Sheets-Sheet 8

INVENTORS
STUART O. FIEDLER
WILLIAM S. FIEDLER
JOHN W. FROST

BY *John L. Diehl*

ATTORNEY

United States Patent Office 3,148,670
Patented Sept. 15, 1964

3,148,670
INTRODUCING COMBUSTIBLE FLUID TO INTERNAL COMBUSTION ENGINE FUEL LINE
William S. Fiedler, 5149 Loruth Terrace, Madison, Wis., Stuart O. Fiedler, deceased, late of Madison, Wis., by William S. Fiedler, administrator, and John W. Frost, 512 E. Parkway Blvd., Appleton, Wis.
Continuation of application Ser. No. 130,235, Aug. 7, 1961. This application Nov. 6, 1963, Ser. No. 324,904
2 Claims. (Cl. 123—127)

This invention relates to means for introducing combustible fluid from a supply of such fluid into an internal combusion engine carburetor in a land vehicle comprising a dashboard, and more particularly to such means wherein the supply of such fluid is a pressurized valved dispensing receptacle attached to a suitable fitting. Such fluid may be a conventional fuel such as gasoline or may be a fluid adapted to deposit a relatively high-temperature, high-pressure lubricant such as molybdenum di-sulfide or colloidal graphite, on the upper cylinder walls, or a fluid containing one or more compositions adapted to dissolve or loosen carbon or sludge within various parts of the engine.

This application is a continuation of application Serial No. 130,235, filed August 7, 1961, having the same entitlement, and now abandoned.

Devices proposed heretofore for this purpose have been relatively complex and relatively difficult to install and to use.

In accordance with a preferred embodiment, a T and a check valve are installed in the fuel line leading to the carburetor (the device being inapplicable in engines in which fuel injection is used in place of a carburetor) and a tube is connected from a pressurized receptacle to the T.

It is therefor an object of the invention to provide improved means for introducing combustible fluid from a supply of such fluid into an internal combustion engine carburetor.

Another object is such a device which will provide improved efficiency and utilization in the engine of fluid introduced through the device.

It is another object to provide such a device which may be installed and operated with relatively great ease, without operation of valves in the engine compartment, and at the same time provide for highly efficient utilization of the fluid introduced through the device.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

FIGURE 2 is a partially cross-sectional elevation of a portion of the device of FIGURE 1;

FIGURE 3 is an elevation of the embodiment of FIGURE 2, with the receptacle nearby, just prior to operation of the device;

FIGURE 4 is a view corresponding to that of FIGURE 3 with the device in operation;

FIGURE 5 is a partially cross-sectional partially cut-away view of the embodiment of FIGURE 4;

FIGURE 6 is a cross-sectional partially cut-away elevation of another modification of the device of FIGURE 2;

FIGURE 7 is a cross-sectional partially cut-away elevation of the embodiment of FIGURE 6 in conjunction with a receptacle, during operation;

FIGURE 8 is a cross-sectional partially cut-away elevation of a modification of the embodiment of FIGURE 6;

Figure 1:
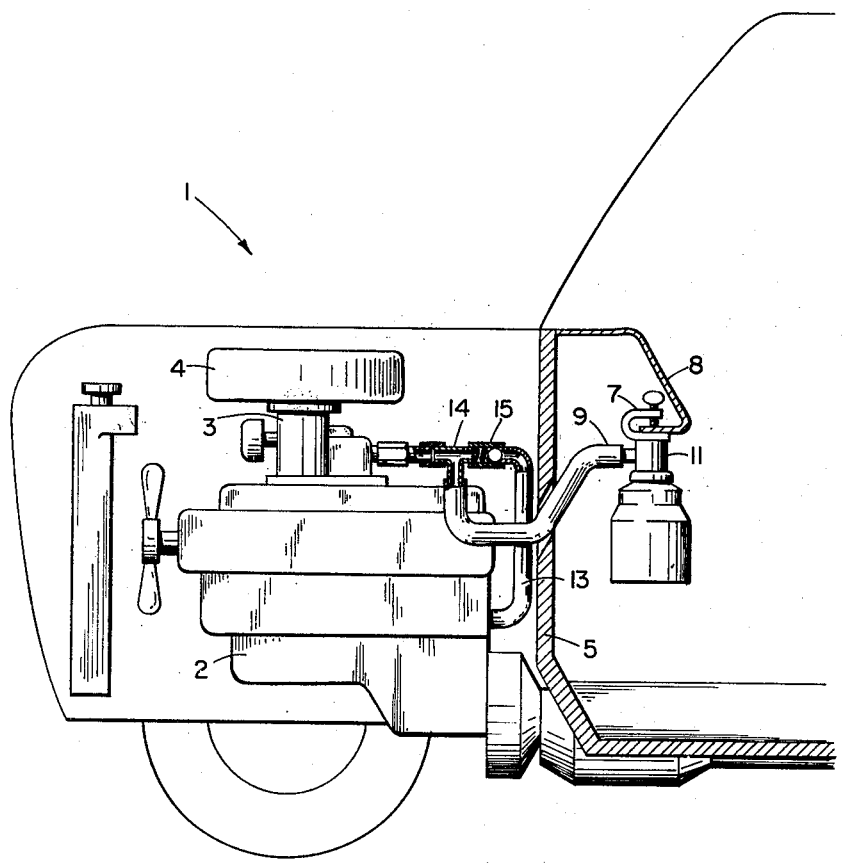
FIGURE 1 is a cross-sectional schematic view of a portion of an automobile provided with an internal combustion engine having the device of the invention applied thereto.

In FIGURE 1 there is shown an automobile indicated generally as 1, having internal combustion engine 2 therein. The invention is equally applicable to such engines which are not in vehicles or are in other vehicles such as boats, aircraft or the like. The engine is fitted with a conventional downdraft carburetor 3 and an air cleaner 4; receiver 11 may comprise clamp 7 which may attach the receiver to dashboard 8 of vehicle 1. Carburetor 3, which supplies fuel-air mixture to engine 2, is provided with fuel line 13 leading thereinto. Tube 9 leads from receiver 11 to T 14 in line 13 and may extend through firewall 5. Check valve 15 is provided in line 13 upstream of T 14 to prevent flow of fluid in line 13 from the carburetor; that is, to prevent flow in a direction reverse to the normal direction of flow in the line. Engine 2 may be any engine supplied with fuel-air mixture through a carburetor.

Referring now to FIGURES 2, 3, 4 and 5 there is shown receiving member 11 which, as shown, may be made of metal or of a suitable platic such as low-density polyethylene, high-density or linear polyethylene, nylon, polypropylene, polycarbonate, or a copolymer of ethylene with any one of several other materials. Receiving member 11 may comprise body 40, and if made of such material, may be fastened to clamp 7 by any suitable means. If body 40 is made of a suitable plastic, it may be fastened to clamp 7 by hot or cold upsetting of portions 19 which may project from body 40. Receiving member 11 also comprises orifice member 43, which is provided with extending cylindrical portion 43'. Portion 43' is hollow inside—that is, it is tubular in form, to provide duct or orifice 44 therewithin, which communicates with a space 42 within body 40, said space being defined by interior wall 41 of body 40. If members 40 and 43 are metal, 43 may be retained in 40 by sweating or soldering or with adhesive. If either member 40 or 43 is of plastic, member 43 is preferably retained in member 40 by use of an interference fit so that placing the two members into the position shown in the figures results in sufficient deformation of each of the members, so that they cannot be taken apart, except with great difficulty. There is preferably provided within space 42 a check valve which may comprise ball 47 biased by coil spring 48 against seat 49 provided in member 43. A passage 46 is provided within body 40, extending from space 42 through inner wall 41 and through the outer wall of body 40 to communicate with the interior of tube 9, so that fluid entering space 42 through duct 44 may leave through passage 46 and thence be conveyed to T 14 through tube 9. The clamp indicated generally as 7, may comprise frame member 81 and thumbscrew 82, which may be operated to attach receiver 11 to dashboard 8. Receiver 11 may be provided with cap 83, which may be a very light press fit with the lower portion of body 40 so that, as shown in FIGURE 2, the cap may be engaged with body 40 frictionally and may be then removed from body 40 to the positions shown in FIGURES 3, 4 and 5, by simply pulling downward on the cap. Cap 83 is preferably attached to body 40 by integral resilient member 84, which acts a hingeable connection to permit installation and withdrawal of the cap with a maximum of ease. Both low-density polyethylene and linear polyethylene have been found suitable as materials of which body 40, member 84, and cap 83 may be made as a single intergral unit.

Pressurized valved receptacle 20 may be held in operator's hand 86 and forced upwardly into engagement with receiver 11, as shown in FIGURES 3 and 4, so that receiver 11 and receptacle 20 are engaged as shown in FIGURE 5. After receptacle 20 is engaged with receiver 11 as shown in FIGURES 4 and 5 it may be removed, by pulling downward with hand 86. Such engagement and removal by translatory motion of receptacle 20, as indicated in FIGURES 3 and 4 may be repeated as many times as necessary or desired, effectively until receptacle 20 is empty. As will be described hereinafter, such translatory motion is preferably substantially on the axis of orifice 44.

T 14 is intended not only to refer to a T as shown in FIGURE 1, but to a Y or any other equivalent connection which provides for connecting together, in communicating relationship, the ends of three tubes, or introducing one tube into the side of another, with a minimum of excess interior space. Thus, it is unsuitable for the invention for T 14 to be or to comprise a reaction chamber, settling chamber, fuel filter pump, or the like or for T 14 or such other equivalent connector to comprise any part of any such other device.

Receptacle 20 preferably contains combustible fluid 21 which may be a conventional fuel such as gasoline, to be utilized in case the regular supply of such fuel contained in the gasoline tank in an automobile for example becomes exhausted. Thus an emergency supply of gasoline may be provided in receptacle 20 which is sufficient to run an automobile from 1 to 4 miles to make it possible to reach a place where additional gasoline may be obtained.

Fluid 21 may alternatively be a compound adapted to provide improved lubrication in various parts of the engine, for example, the cylinders and pistons, which may have any composition proposed for this purpose and need not be entirely combustible; such a fluid may, for example, be colloidal graphite or molybdenum di-sulfide or both, suspended in kerosene or some other mixture of somewhat volatile organic liquids. Fluid 21 may alternatively be a liquid of any suitable composition for removing gum or carbon or other deposits from various portions of the interior of the engine. Especially suitable for the use in the invention, for example may be fluid adapted to dissolve and remove gum deposits from the interior of the carburetor. Any of the aforesaid liquids or combinations of them is maintained under pressure by additionally introducing into the receptacle a fluid adapted to provide such pressure. The fluid may be a gas such as nitrogen or may be a fluid which under the pressure provided in the container is normally liquid at room temperature, such as, for example, butane, $CO_2$, nitrous oxide or certain halogenated hydrocarbons of relatively low molecular weight, especially those sold by the duPont Company under the tradename "Freon." Fluid 21 is in most cases combustible and is described hereinafter as combustible but need not be at all combustible if it has utility in the engine. For example, it may be a halogenated hydrocarbon analogous to carbon tetrachloride which acts to clean certain deposits from interior portions of the engine, it being necessary to the utilization of such non-combustible liquid that one or more of the orifices described hereinafter be sufficiently small to cause enough normal fuel to enter carburetor 3 from line 13 to cause the engine to continue operating despite simultaneous introduction of such non-combustible liquids at a relatively low flow rate.

Receptacle 20 contains valve 35′ having member 35″ which seats on seat 36; it also comprises sealing washer 34″ of elastomeric material. Cylindrical member 43′ is provided with one or more notched passageways 45. When receptacle 20 and receiver 11 are engaged as in FIGURES 4 and 5, the interior edge of sealing member 34″ which provides a dispensing orifice for receptacle 20 is in sealing engagement with the outer surface of cylindrical member 43′ to prevent passage of fluid therebetween, and the end of member 43′ presses downward on valve member 35″ which is biased upwardly by spring 38, so that valve member 35″ is forced off of seat 36 and fluid may pass upward from dip tube 39 into space 42 as shown by arrows 44′.

It may be seen that when receptacle 20 and receiver 11 are engaged as in FIGURES 4 and 5, orifice 44 and the orifice provided by sealing member 34″ are in sealed engagement, so that fluid passes upward through the outlet duct provided in receptacle 20 around spring 38 and between valve member 35″ and seat 36 and along the upper stem of member 35″, thence through passage 45 and duct 44 into space 42, as shown by arrows 44′, and cannot pass outward or escape from the device since the orifice members are in sealed engagement; that is, orifice member 43 is in sealed engagement with the dispensing orifice of receptacle 20 provided by member 34″.

Referring now to FIGURES 6 and 7, there is shown another embodiment wherein receiver 11″ comprises body 40″, orifice member 43″, and member 47″ which acts as a check valve to prevent reverse flow. Member 43″ provides orifice or duct 44″ leading into the space 42″ defined by inner wall 41″ of body 40″. Member 43″ may be attached to member 40″ in any suitable manner, such as by use of an interference fit or by adhesive. Passage 46″ leads out of space 42″ through inner wall 41″, thence through the outer wall of body 40″ and through tube 9″, which may serve as means for connecting receiver 11″ to tube 9. Cap 83″ may be attached to body 40″ by member 84″ in the same manner as cap 83 is affixed to body 40 by member 84 or in any other suitable manner, and during operation of the device may be removed and easily pushed to one side as shown in FIGURE 4. Pressurized receptacle 20, which may contain fluid 21, of the type described above, may contain outlet valve 35 having tubular member 34 which provides an outlet duct 34′, which may also constitute a dispensing orifice, valve 35 being so constructed that when tube 34 is pressed downwardly into outlet valve 35, fluid from the interior of receptacle 20 is dispensed outwardly through the orifice duct 34′.

In operation, receptacle 20 is forced, by an operator's hand, upwardly toward receiver 11″, so that the upper outer peripheral edge of member 34 is engaged with the interior surface of member 43″, that is orifice duct 44″, which is an inner tubular surface which converges inwardly toward receiver 11″. Thereby, as shown in FIGURE 7, fluid 21 travels upward as shown by arrows 94″ through orifice duct 34′ and orifice duct 44″, past the point where these two orifice ducts are sealed together at the outer upper peripheral edge of tubular member 34 and the surface of duct 44″ (forcing member 47″ off of its seat), around one edge of member 47″ and through the cut-away portion provided in space 42″ as shown and thence outward through duct 46″.

Member 47″ is preferably a soft elastomeric disk of any suitable material, such as a sulphur-containing rubber material sold under the trade name "Thiokol" and may be disposed to seat against the rear surface of member 43″ to close orifice duct 44″ if pressure is exerted against the rear side thereof by gas flow from duct 46″ through space 42″ toward duct 44″.

Figure 9:
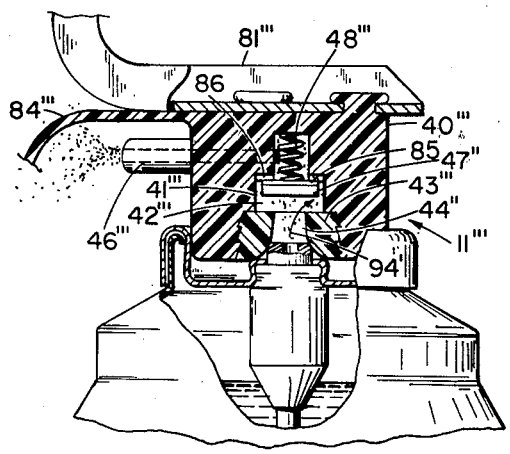
FIGURE 9 is a cross-sectional partially cut-away elevation of the embodiment of FIGURE 8 in conjunction with a receptacle, during operation.

In the modification of the embodiment of FIGURES 6 and 7 shown in FIGURES 8 and 9, orifice member 43‴ is attached to body 40‴ to provide receiver 11‴ having space 42‴ therewithin defined by inner wall 41‴. Space 42‴ may contain check valve means to prevent reverse flow which may consist of a soft elastomeric washer member 47″ which, as shown, may be identical with the corresponding member in the embodiment of FIGURES 6 and 7, or, as now shown for simplicity, may be varied in dimensions, resiliency, material, softness, or the like. Member 47″ is preferably provided with a back-up member 85, which may be a disk of metal or like rigid material such as plastic to prevent excessive deformation of member 47″, and members 85 and 47″ may be biased downwardly by any suitable resilient means, such as coil spring 48. Interior wall 41‴ is provided with a plurality of downwardly projecting members 86 in the rear of member 85 to prevent member 85 from seating against the portion of wall 41‴ which is above it and thereby to allow for flow of fluid upwardly around members 47″ and 85 when they are forced into the position shown in FIGURE 9 by reason of flow of fluid through the device as shown therein by arrow 94′.

In operation, the device is utilized as shown in FIGURE 9 to operate in the same manner as described in connection with FIGURE 7.

Figure 10:
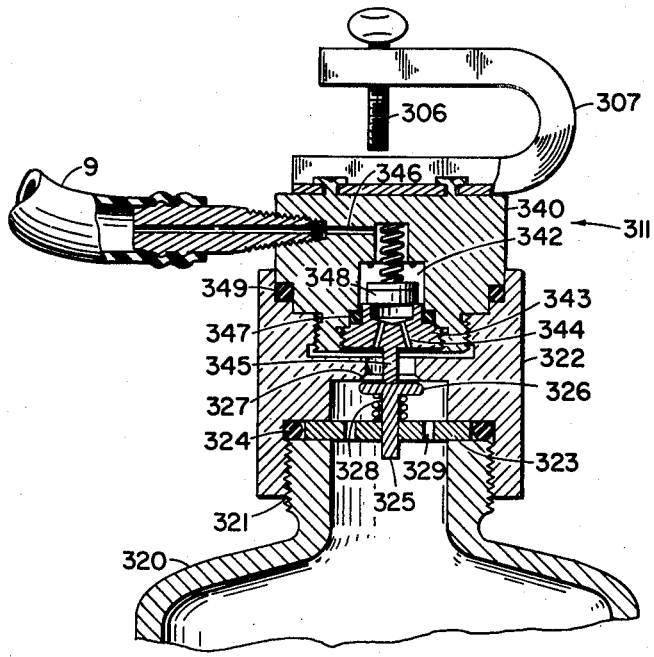
FIGURE 10 is a cross-sectional partially cut-away view of another modification of a portion of the apparatus of FIGURE 1.
Figure 11:
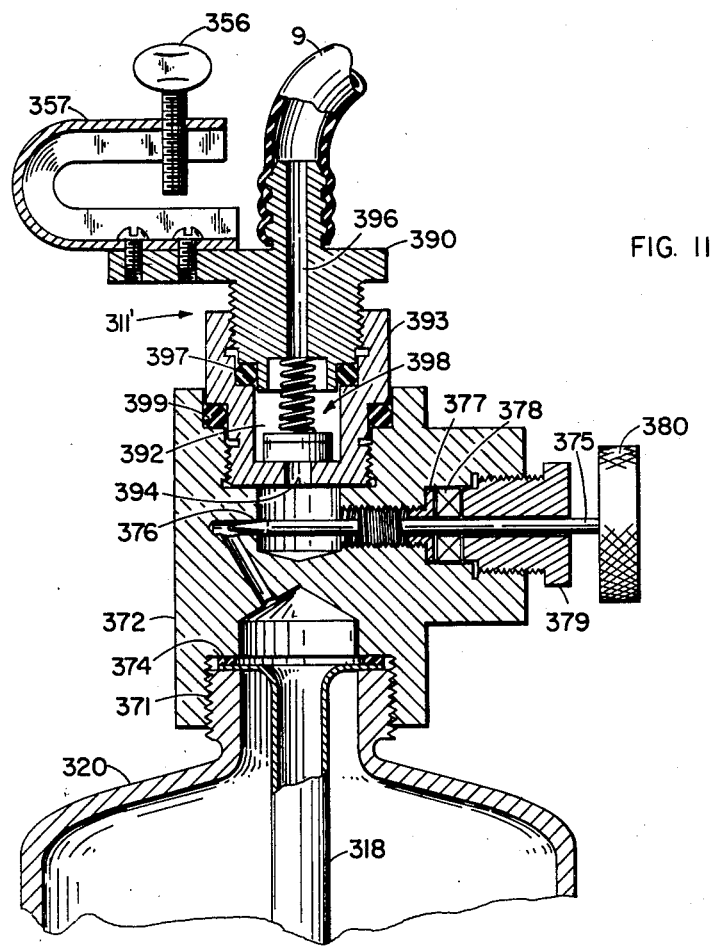
FIGURE 11 is a cross-sectional view of a modification of the device of FIGURE 10.

In FIGURES 10 and 11 there are shown receivers 11 and 311′ respectively which may be utilized to attach to a dashboard by means of clamp 307 or 357 respectively, a relatively large heavy walled receptacle 320 such as is most usually utilized to contain or be pressurized with propane or $CO_2$.

As shown in FIGURE 10, clamp 307 may be attached to a dashboard by operation of thumbscrew 306; attached to clamp 307, there may be provided body 340 of receiver 311 which may be provided with interior space 342 having passage 346 leading therefrom to the interior of tube 9. Attached to the top of receptacle 320 there may be provided a closure member 322 which may contain a valve member 325 having sealing portion 326 adapted to seat against seat 327. Compression spring 328 may act against spring retainer and spacer member 323 to bias valve member 325 upwardly to cause portion 326 to seat against seat 327. Closure 322 may be threadedly engaged with the top of receptacle 320 at 321 to retain thereinbetween spacer 323 with a sealing member such as O-ring 324 disposed to seal the connection between closure 322 and receptacle 320. To retain receptacle 320 in connection with receiver 311, closure 322 may be threadedly engaged with body 340 as shown and may be sealed thereto with a sealing member such as O-ring 349. Threadedly attached to body 340 there may be provided orifice member 343 having downwardly projecting member 345 and sealing member such as O-ring 347 to seal the connection between it and body 340. Member 343 may be provided with a plurality of tubular ducts or passages 344 extending upwardly from its lower surface to communicate with a single aperture immediately below a check valve indicated generally as 348 which may be contained in space 342. It may be seen that as closure 322 is screwed onto body 340 it is sealed thereto by O-ring 349 and at the same time member 345 extends downwardly to press against valve 325 to lift it off seat 327 and allow the fluid to flow upwardly from receptacle 320 through holes 329 and thence through holes 344, space 342 and passage 346 to tube 9. The embodiment of FIGURE 10 is particularly suitable for introducing gas from container 320 to tube 9 but may be suitably adapted by providing a dip tube therein such as tube 318 of FIGURE 11, to dispense liquid upwardly from the bottom of receptacle 320 and thence to tube 9.

In the embodiment of FIGURE 11, receptacle 320 is provided threadedly engaged at 371 with a closure 372, being sealed thereto by a sealing member such as washer or gasket 374. Closure 372 is provided with a manually operated valve and in distinction to the embodiment of FIGURE 10 the valve may be operated to prevent dispensing or to dispense fluid from receptacle 320 independent of whether closure 372 is engaged with receiver 311′ or not. The valve may comprise needle valve member 375 which may be manually rotated by operation of knob or wheel 380 to seat against seat 376. Leakage past the stem portion of member 375 may be prevented by packing retainer nut 377, packing 378 and packing compression nut 379. Closure 372 may be threadedly engaged with member 393 of receiver 311′ and sealed thereto by a sealing member such as O-ring 399. Member 393 may be threadedly attached to body 390 as shown and may be sealed thereto by a sealing member such as O-ring 397. An orifice or duct 394 may be provided in 393 as shown and space 392 defined by interior walls of members 393 and 390 may be provided with a check valve indicated generally as 398. Extending from space 392 there may be provided passage 396 to communicate with tube 9. Body 390 may be attached to clamp 357 which may be engaged with a dashboard by thumbscrew 356.

In operation, when valve 375 is opened by rotation of operating wheel 380, fluid passes upwardly from receptacle 320, past seat 376, through orifice 394, forcing check valve 398 off its seat and then passes through space 392 and passage 396 to tube 9. The embodiment of FIGURE 11 is adapted to dispense liquid as a fluid from receptacle 320 and liquid passing upwardly from the bottom of the receptacle through tube 318 and thence upwardly past seat 376 in the manner hereinbefore described.

The embodiment of FIGURE 10 may be provided with a dip tube such as dip tube 318 to dispense liquid from receptacle 320 or the embodiment of FIGURE 11 may have dip tube 318 removed therefrom to dispense gas from receptacle 320 in the manner described in connection with the embodiment of FIGURE 10.

Figure 12:
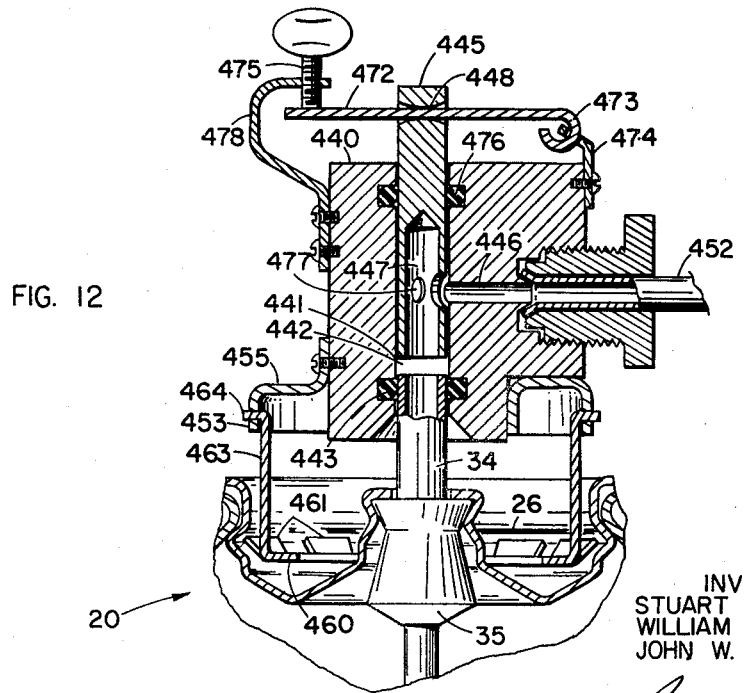
FIGURE 12 is a cross-sectional view of another embodiment of a portion of the apparatus of FIGURE 1.

Referring now to FIGURE 12, there is shown another embodiment wherein receiver 440 is maintained in engagement with receptacle 20 by portions 464 of members 463 which engage surfaces 453 of member 455 which is attached to body 440. Members 463 extend upwardly from member 460 and extend outwardly at 464; member 460 has portions 461 which engage portion 26 of receptacle 20. Within body 440, space 442 is defined by interior walls 441. Tube 34 extends into space 442 in sealing engagement with orifice member 443 which may be an O-ring as shown. Passage 446 extends outwardly from inner wall 441 through body 440 to the interior of tube 452, which is attached to body 440 in any conventional means as shown. Valve member 445, which may be cylindrical as shown, may extend downward through body 440 into space 442 and be maintained in sealing engagement with body 440 by any suitable means, such as O-ring 476. Member 445 may be drilled or bored to provide space 447, so that its lower portion may be essentially tubular as shown, and the wall of this tubular portion may be provided with apertures such as holes 477 extending outwardly therethrough to communicate with passage 446.

Means to force member 445 slidably downward into contact with the end of tube 34 and to then further depress tube 34 to open valve 35 may comprise lever 472 extending through hole 448 in member 445 and hingeably attached at 473 to bracket 474, which may be suitably attached to body 440. Downwardly extending screw 475 may be threadedly engaged with bracket 478 so that its lower end bears downwardly on the end of lever 472, which is on the opposite side of member 445 from hinge 473.

By thus suitably rotating screw 475, member 445 may be lowered or raised to open or close valve 35, raising of 445 being accomplished by reason of a spring, not shown, within valve 35, which biases tube 34 upwardly and thereby forces member 445 upwardly when downward pressure on lever 472 is released by backing off screw 475. Fluid is dispensed upwardly from the orifice provided by the interior of tube 34, thence through space 442, space 447, holes 477, passage 446, and tube 9 to T 14.

Figure 13:
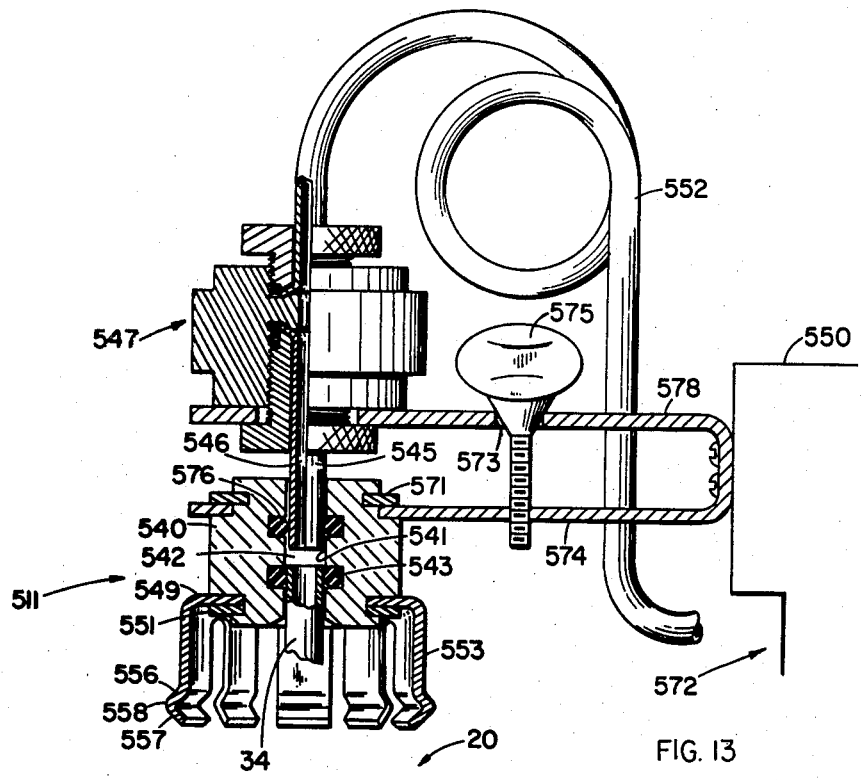
FIGURE 13 is a cross-sectional view of a further modification of the embodiment of FIGURE 12.

Referring now to FIGURE 13, there is shown another embodiment wherein receptacle 20 is attached to body 540 of receiver 511 by portions 558 of members 553 extending downwardly from flange 549. Members 553 extend downwardly from flange 549, which is attached to body 540, and extend outwardly at 556 and inwardly at 557 to provide portions 558 which engage portion 26 of receptacle 20. Flange 549 may be attached to body 540 by snap ring 551. Tube 34 is received in sealing engagement with orifice member 543 into space 542 defined by interior wall 541 of body 540.

Body 540 may be attached to dashboard 550 by bracket 574 (which is preferably slightly resilient), by snap ring 571.

Tubular member 545 may extend downward through body 540 into space 542, being slidably received in body 540 and maintained in sealing engagement therewith by sealing member 576, which may be an O-ring as shown. Member 545 may be attached to tube 552 in any suitable manner, such as by conventional connector or coupling 547, which may be attached to dashboard 550 by slightly resilient bracket 578. Passage 546, within tubular member 545, communicates or provides a duct between space 542 and the interior of tube 552. Screw 575 extends through hole 573 in bracket 578 and is threadedly engaged in bracket 574. Tube 552 may be provided with a loop, as shown, or any other suitable means may be provided to make it possible for coupling 547 and body 540 to undergo translatory motion toward and away from each other. Member 545 may be forced downwardly into body 540 and into contact with the top of tube 34 to press tube 34 downwardly to open valve 35 by rotating screw 575 and thereby forcing the outer ends of brackets 574 and 578 together to force coupling 547 and body 540 to move toward each other, whereupon fluid is dispensed upward from receptacle 20 through the interior of tube 34, space 542, passage 546, and tube 9 to T 14.

Figure 14:
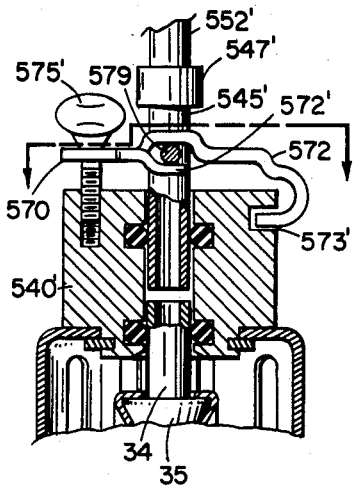
FIGURE 14 is a cross-sectional view of a modification of the embodiment of FIGURE 13.
Figure 15:
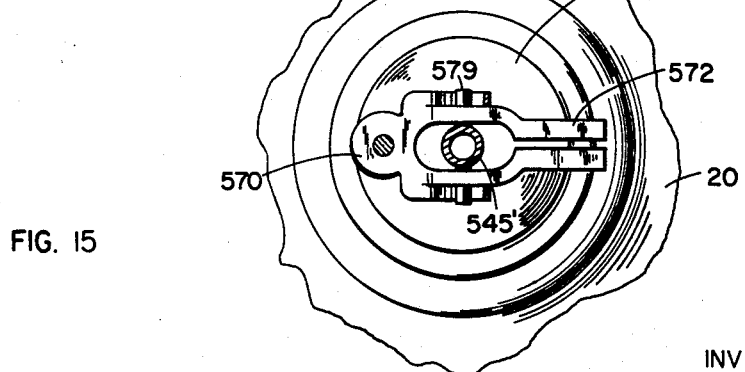
FIGURE 15 is a cross-sectional view taken on line 15—15 in FIGURE 14.

A modification of the embodiment of FIGURE 13 is shown in FIGURES 14 and 15 wherein valve operating member 545' is connected to tube 552' by soldered connector 547'. Valve operating screw 575' extends through a hole in one end of lever 572 and is threadedly engaged in body 540', being provided with shoulder 570 to engage the edge of the hole in lever 572. Lever 572 is engaged with the upper surfaces of pins 579, which may extend laterally from member 545'. Lever 572 may be provided with extending tabs 572' to engage the lower surfaces of pins 579; its end which is opposite screw 575' may be loosely engaged in space 573' to provide for its hingeable movement with respect thereto. Operation is as with the embodiment of FIGURE 13 in that operation of screw 575' may cause members 20 and 547' to move toward each other, whereupon the lower end of member 545' presses downwardly on tube 34 to open valve 35.

Figure 16:
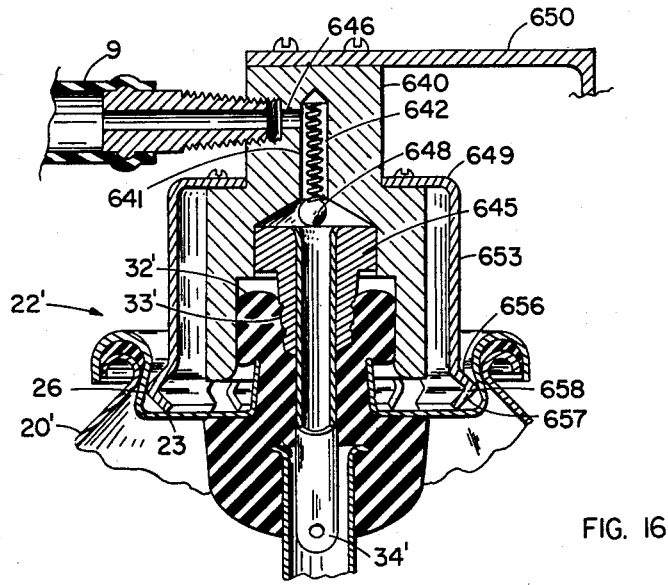
FIGURE 16 is a cross-sectional view of another embodiment of the device of FIGURE 13.

As shown in FIGURE 16, container 20' comprises dished metal closure member indicated generally as 22', which corresponds to closure 22 with respect to parts similarly numbered and has inner portion 30' extending upward from the inner periphery 31 of bottom 23 and is provided with substantially annular top portion 32' having hole 33' in the center thereof, through which tubular member 34' extends downwardly. This type of closure is described in United States Patents 2,860,820, and 2,683,484. Receptacle 20' may suitably form part of an apparatus in accordance with the invention by reason of members 643, which extend downwardly from flange 649, having outwardly protuberant portions 658 defined by outwardly extending portions 656 and inwardly extending portions 657; portions 658 engage portion 26 of member 22'. Flange 649 may extend outwardly and downwardly from body 640 as shown, being attached thereto by any suitable means, such as screws.

Body 640 is provided with downwardly extending tube or orifice member 34' and with member 645 to maintain it in place. Orifice member or tube 34' sealingly engaged with portion 32' of the closure in the manner described in the previously mentioned patents. Portion 32' acts to prevent removal of fluid by leakage or otherwise from the receptacle when tube 34' is withdrawn and thus constitutes a valve which is opened by member 34'. Check valve 648 may be provided in the interior space 642 defined by interior walls 641 of body 640, and passage 446 may lead outward from space 642 to tube 9 which leads to T 14. In addition to check valve 648, a valve may be provided which may be manually operated to control flow rate. Body 640 may, if desired be attached to dashboard 650.

Figure 17:
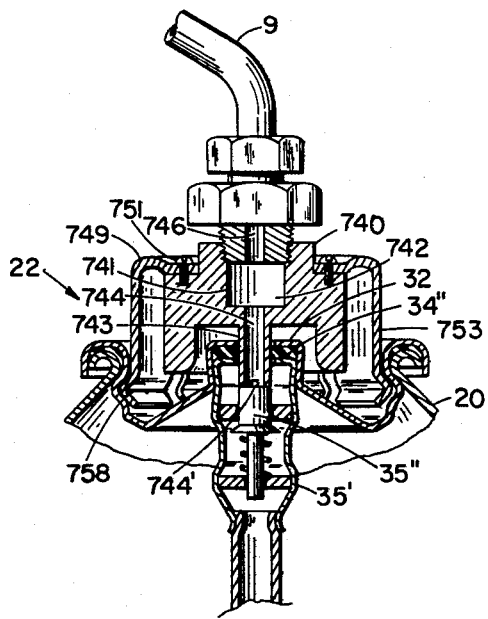
FIGURE 17 is a cross-sectional view of still another embodiment of the device of FIGURE 13.

In the embodiment of FIGURE 17, receptacle 20 is provided with valve 35' which differs from valve 35 in that a cylindrical member must be introduced downward through the orifice provided by the hole in the center of sealing washer 34" which underlies top portion 32 of closure 22. Body 740 may be provided with downwardly extending tubular orifice member 743, which may be provided with orifice or duct 744 in the interior thereof leading from the interior of valve 35' to space 742 in the interior of body 740 defined by interior walls 741 of body 40. The end of member 743 may engage the top of a valve member such as member 35" within valve 35' to push it downwardly to open the valve and may be provided with opening 744', which may be an orifice, to provide communication between the interior of valve 35' and duct or orifice 744. The outer surface of member 743 is sealingly engaged by the inner edge of member 34". Passage 746 may lead from body 740 to tube 9, which leads to T 14. Body 740 may be maintained engaged with receptacle 20 by portions 758 of members 753, which extend downwardly from flange 749 attached to body 740 by 751. A valve or check valve is preferably provided within space 742 in the manner discussed in connection with previously described embodiments.

Due to difficulties in creating and maintaining a suitable seal at all points between passage 646 or 746 and the interior of the receptacle, the embodiment of FIGURE 17 is less preferred than other embodiments, and the embodiment of FIGURE 16 is unpreferred.

It may be noted that tube 9 has no valve in it in every case; it may also be noted that the receptacle in all embodiments is provided with a valve; in preferred embodiments such valve is opened and maintained open by a member which is part of the receiver.

It may thus be seen that the invention is broad in scope and includes such modifications as will be apparent to those skilled in the art and is to be limited only by the claims.

Having thus described our invention, we claim:

1. Means for introducing combustible fluid from a supply of such fluid into an internal combustion engine, said engine having a carburetor and a liquid fuel line leading to said carburetor, said means comprising a T in said fuel line upstream of said carburetor, a check valve in said fuel line upstream of said T, a receiver containing a check valve, an unvalved tube leading from said T to said receiver, said receiver retaining in place a valved pressurized receptacle containing said fluid with said valve of said receptacle open and the interior of said container in sealed communicating relation with said tube.

2. The means of claim 1 in a land vehicle having a dashboard wherein said receiver retains said receptacle at said dashboard and a member of said receiver retains open the valve of said receptacle.

References Cited in the file of this patent

UNITED STATES PATENTS

| | | |
|---|---|---|
| 2,706,977 | Pritchard | Apr. 26, 1955 |
| 2,708,922 | Neely | May 24, 1955 |
| 2,851,027 | Kivela | Sept. 9, 1958 |
| 2,857,900 | Neely | Oct. 28, 1958 |
| 2,857,901 | Neely | Oct. 28, 1958 |
| 2,862,491 | Burack | Dec. 2, 1958 |

FOREIGN PATENTS

| | | |
|---|---|---|
| 414,410 | Great Britain | Aug. 3, 1934 |